United States Patent
Trumble

[11] Patent Number: 6,131,386
[45] Date of Patent: Oct. 17, 2000

[54] SINGLE MODE RESONANT CAVITY

[75] Inventor: Francis Robert Trumble, Bicks, United Kingdom

[73] Assignee: Central Research Laboratories Limited, Middlesex, United Kingdom

[21] Appl. No.: 09/077,994

[22] PCT Filed: Dec. 11, 1996

[86] PCT No.: PCT/GB96/03039

§ 371 Date: Jun. 15, 1998

§ 102(e) Date: Jun. 15, 1998

[87] PCT Pub. No.: WO97/21911

PCT Pub. Date: Jun. 19, 1997

[30] Foreign Application Priority Data

Dec. 14, 1995 [GB] United Kingdom .................... 9525543

[51] Int. Cl.$^7$ ........................................................ F01N 3/00
[52] U.S. Cl. ........................ 60/274; 60/275; 60/300; 60/312; 422/186.04; 333/135; 333/212; 333/231
[58] Field of Search ............................. 60/275, 274, 300, 60/303, 312; 422/168, 186, 186.01, 186.02, 186.03, 186.04; 55/DIG. 30; 333/135, 208, 212, 227, 230, 231, 228

[56] References Cited

U.S. PATENT DOCUMENTS

| | | |
|---|---|---|
| 3,502,934 | 3/1970 | Friedlander et al. . |
| 3,899,759 | 8/1975 | Hines et al. ................................ 333/73 |
| 4,267,537 | 5/1981 | Karmel ...................................... 333/231 |
| 4,315,230 | 2/1982 | Biehl et al. . |
| 4,477,771 | 10/1984 | Nagy et al. ............................. 324/58.5 |
| 4,523,127 | 6/1985 | Moeller ........................................ 315/4 |
| 4,544,901 | 10/1985 | Rhodes et al. ........................... 333/212 |
| 4,777,336 | 10/1988 | Asmussen . |
| 4,825,651 | 5/1989 | Puschner et al. ........................... 60/275 |
| 4,934,141 | 6/1990 | Ollivon et al. ............................. 60/275 |
| 5,074,112 | 12/1991 | Walton et al. ............................. 60/275 |
| 5,180,559 | 1/1993 | Ma ........................................... 422/168 |
| 5,195,317 | 3/1993 | Nobue et al. .............................. 60/275 |
| 5,714,920 | 2/1998 | Ivanov et al. ......................... 333/219.1 |

FOREIGN PATENT DOCUMENTS

WO 97/14507   11/1990   WIPO .

*Primary Examiner*—Binh Tran
*Attorney, Agent, or Firm*—Evenson, McKeown, Edwards & Lenahan, PLLC

[57] ABSTRACT

A single mode resonant cavity is adapted to absorb energy via a single excitation mode in a plurality of overlapping absorption bands having different respective resonant frequencies, thereby increasing the resonant bandwidth of the cavity. The high Q-factor cavity may form part of a microwave powered catalytic converter for exhaust gas, and has the advantage that as the cavity warms up and physically expands the coupling efficiency between the cavity and a relatively narrow waveband microwave source remains good.

13 Claims, 3 Drawing Sheets

SINGLE MODE RESONANT CAVITY

BACKGROUND AND SUMMARY OF THE INVENTION

This invention relates to a single mode resonant cavity, and particularly, though not exclusively, to cavities for heating exhaust gas catalytic converters.

The increasing importance of environmental issues in many countries in recent years has led to the development of ways to minimize pollution from sources such as vehicle exhausts. This has derived both from legislation and from a desire on the part of companies to be seen to be concerned with minimizing harmful environmental impacts. One important technology which has been developed is that of the catalytic converter. In such systems the exhaust gasses are made to pass over a heated catalyst matrix in a chamber in the presence of other reactive species. Although such systems work very well in general, they only work at peak efficiency after the catalyst has been heated above a critical temperature known as its "light off" temperature. As the catalyst in most systems is heated mainly by the exhaust gas itself, there will be an initial period of time when the exhaust gas is poorly converted. This problem is particularly severe in countries having cooler climates such as Japan, USA, Canada, Russia, Korea, and Northern Europe.

One solution to this problem is to heat the catalyst using a different method which does not depend upon the temperature of other parts of the engine. A known way of heating catalyst mixtures in catalytic converters using microwave radiation is disclosed in WO 90/14507. In this method microwave energy is used to heat a part of a matrix of catalyst material placed in a waveguide which need not be a resonant cavity. However, this method has the drawback that if a resonant cavity is employed then it is likely to heat up together with the catalyst and expand. This expansion alters the resonant frequency of the cavity which then fails to match the microwave energy source electrically.

According to a first aspect of the invention there is provided a single mode resonant cavity, as claimed in claim 1. This can have the advantage that as the cavity warms up and physically expands the coupling efficiency between the cavity and a narrow waveband microwave source remains good.

According to a second aspect of the invention there is provided a catalytic converter system for exhaust gas, as claimed in claim 5.

According to a third aspect of the invention there is provided a method of coupling energy via a single excitation mode to a resonant cavity from a source of a.c. electromagnetic energy having a given bandwidth, comprising adapting the cavity to absorb energy via the single excitation mode in a plurality of absorption bands having different respective resonant frequencies. The cavity is preferably adapted by either the provision of an electrically conductive element inside the cavity adjacent and electrically connected to a wall thereof, or by deformation thereby providing at least a part of the cavity with an elliptic cross-section.

BRIEF DESCRIPTION OF THE DRAWINGS

Embodiments of the invention will now be described by way of example only, with reference to the accompanying diagrammatic drawings in which.

DETAILED DESCRIPTION OF THE DRAWINGS

Figure 1:
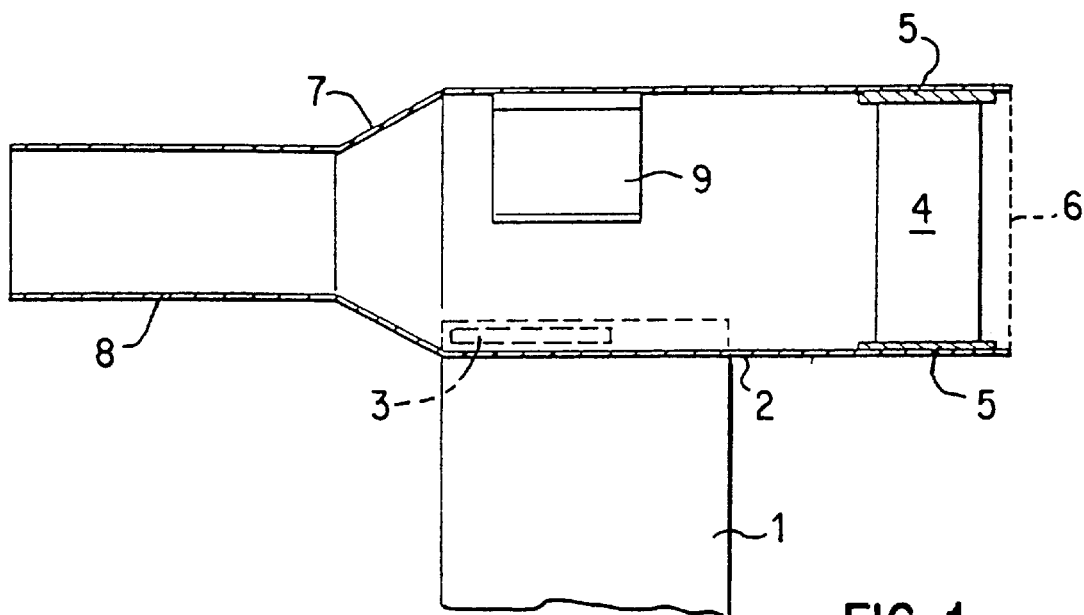
FIG. 1 shows a longitudinal cross section of a cavity.

FIG. 1 shows a single mode resonant cavity (2), for use in a catalytic converter system, being adapted to absorb electromagnetic energy via a single excitation mode in a plurality of absorption bands having different respective resonant frequencies. Electromagnetic energy in the form of microwaves is introduced into the cavity via a pair of coupling slots (3) from a wave guide (1). The cavity contains the catalytic converter matrix (4), which is located towards one end of the cavity and is held in place by a mat (5) of a low loss dielectric material (such as "Interam" made by 3M) being spaced a short distance from a microwave reflector (6) comprising one end of the generally cylindrical cavity. The microwave reflector (6) is constituted by an electrically conductive mesh made of a metal. This allows exhaust gasses to pass into or out of the cavity substantially unimpeded. The other end of the cavity consists of a tapered part (7), in the present example a truncated cone, connected to a cylindrical tube (8) having a smaller diameter than the rest of the cavity. The diameter of the tube is chosen so that the cone 7 and tube 8 act as a cut-off wave guide, i.e. microwave energy cannot propagate freely along the tube 8. As described, the cavity has a microwave reflector at one end and a cut-off wave guide at the other. As an alternative, both ends could comprise microwave reflectors or cut-off wave guides. The present example uses a tapered portion because it results in an aerodynamic advantage.

Figure 5:
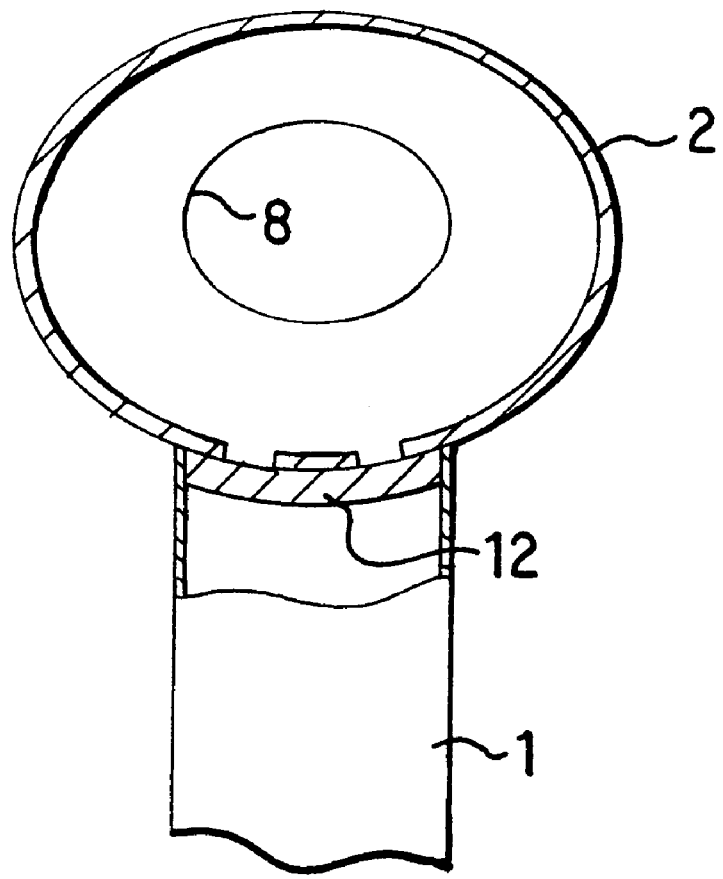
FIG. 5 shows a transverse cross-section of another embodiment of the cavity according to the invention.

In the present example, the diameter of the largest part of the cavity is 80 mm, and the microwave energy is produced at a frequency of 2.45 GHz by an 800W magnetron (not shown) coupled to the other end of the wave guide 1. This arrangement results in a single $TE_{11p}$ mode being excited in the cavity. The Q factor of such a cavity containing catalyst material is of the order of 100, and as a result it is difficult to keep the impedance of the cavity and source matched as the catalyst and cavity warm up and the cavity diameter increases due to thermal expansion. It is therefore necessary to adapt the cavity to increase its bandwidth. In the present invention this is achieved by splitting the $TE_{11p}$ mode (where p is an integer). This is achieved in the cavity of FIG. 1 by attaching an electrically conductive element 9 to the wall of the cavity. In the present example this element is in the form of a curved metal sheet 3.6 mm in thickness. Other methods of splitting the single mode such as deforming the substantially circular cylinder into an elliptical shape may be used as an alternative (FIG. 5). It is believed that by breaking the symmetry of the single mode cavity, the same single mode will be excited at slightly different resonant frequencies in different directions.

Figure 2:
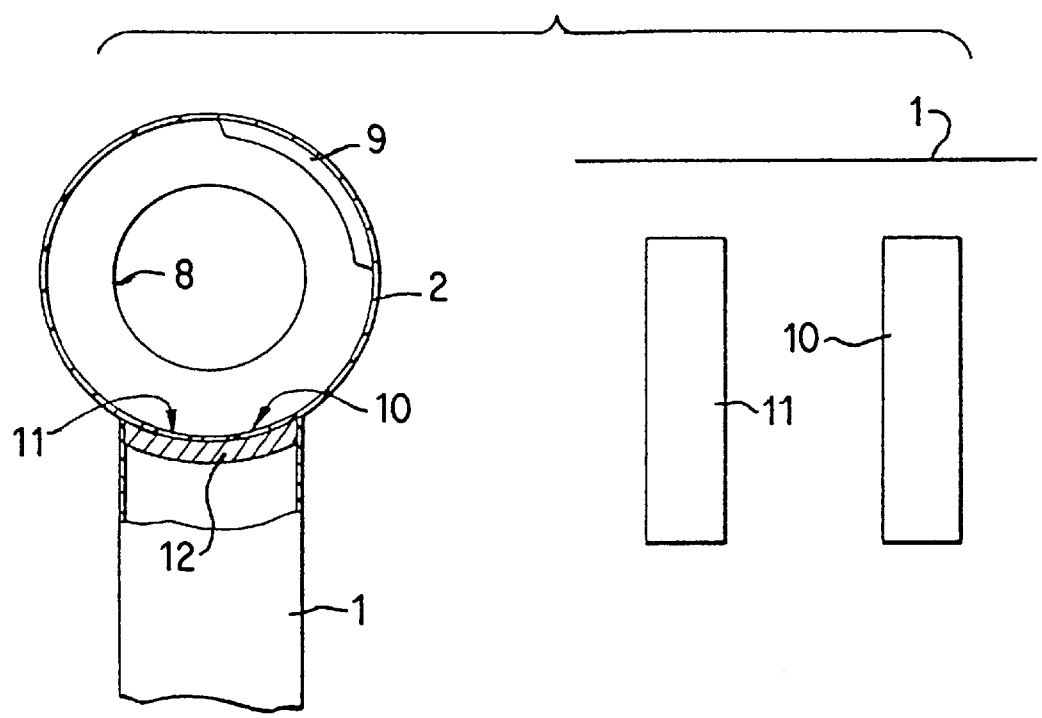
FIG. 2 shows a transverse cross section of the cavity of FIG. 1, plus a plan view of the coupling slots in the cavity wall.

The dimensions of the cavity and the coupling slots must be carefully optimized to ensure that the microwave energy can be efficiently absorbed by the catalyst matrix (4). The arrangement used in the present example is illustrated in the transverse cross-section of the cavity shown in FIG. 2. The coupling slots are in the form of rectangular slots cut out from the cavity wall (10, 11). These slots are each 38 mm long and 10 mm wide and separated from one another by 20 mm. In addition a low loss dielectric mat (12) 6.4 mm thick is positioned at the end of the wave guide next to the slots in the chamber wall. Two slots are required to couple equal amounts of microwave energy into each of the split mode components.

Figure 3:
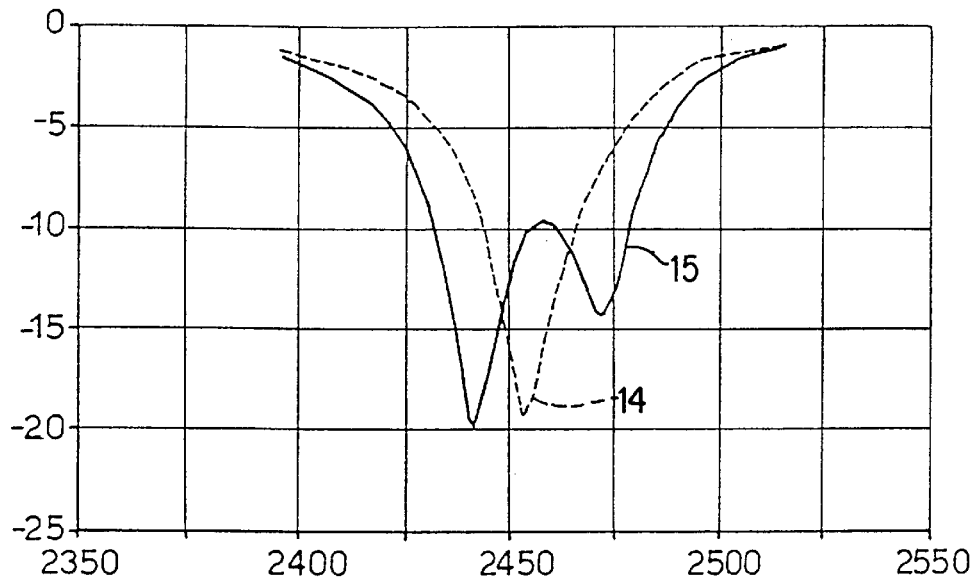
FIG. 3 shows a graph of absorption versus frequency for the cavity of FIG. 1 a prior art cavity.

The mode splitting can be seen from the graph of absorption versus frequency for the cavity shown in FIG. 3, The y axis represents return loss in decibels, whilst the x axis represents frequency. The graph numbered 14 shows the absorption spectrum for a cavity which does not have the mode splitting element, whilst the graph numbered 15 shows the absorption spectrum for a cavity according to the present invention in which the mode splitting element (or deformed cylindrical cavity) is present. A return loss of −10 dB means that 10% of the incident power is reflected back to the microwave source. It can be seen from this figure that the bandwidth of graph 15 at the −10 dB point is approximately twice that of graph 14 at the same return loss level. Thus the bandwidth of the cavity in which the single mode is split is twice that of the cavity in which it is not split—in effect the Q factor of the cavity has been halved. Since the magnetron microwave source operates within a narrow frequency band (of the order of 10 MHz), this means that the cavity dimensional tolerances are far less critical for efficient energy coupling to the cavity and catalyst matrix.

Figure 4A:
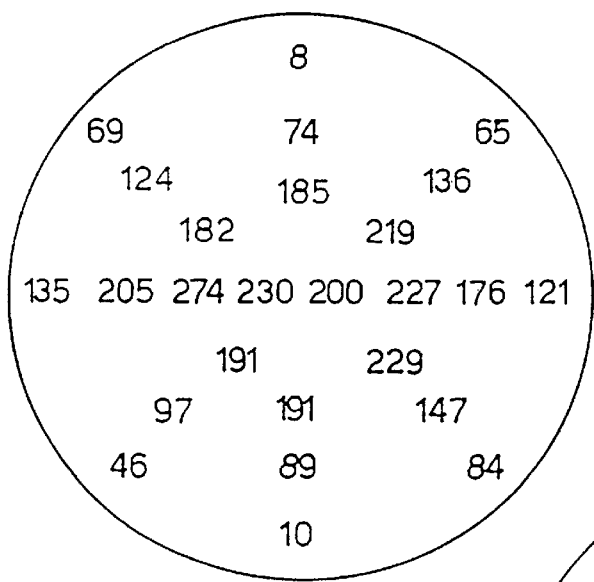
FIGS. 4a and 4b show the radial power distribution for the cavity of FIG. 1 and a prior art cavity, respectively.
Figure 4B:
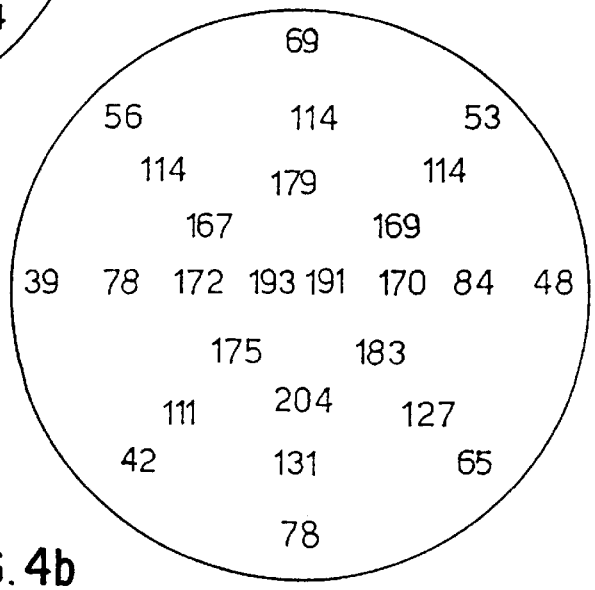

An additional advantage of mode splitting is that the heating uniformity of the system improves. The radial power distribution in the cavity at the position of the catalyst matrix is shown in FIGS. 4a and 4b. In FIG. 4a the power distribution is shown for the $TE_{11}$ mode without splitting, whereas FIG. 4b shows the power distribution at the same place in the cavity when the single mode is split into two overlapping absorption bands as shown in graph 15 of FIG. 3. In the case of FIG. 4a, the fields are concentrated along the horizontal axis, and show a maximum in the center. The power tends to zero at the cavity walls along the axis of the cylinder at the top and bottom. The ratio between the maximum and minimum measured power is 33 in the case of FIG. 4a. In the case of the split mode shown in FIG. 4b, the power is less intense at the center, and more power is distributed along the top and bottom of the axis of the cylinder. In addition, power is shifted closer to the cavity walls. The ratio between the maximum and minimum measured power in this case is 5. The uniformity of power distribution in the cavity is therefore superior in the case of split single mode operation.

Although in the above examples an end fed WG8A rectangular waveguide has been used to couple the microwave energy, coupling via the narrow wall of a WG9A rectangular waveguide may be used as an alternative.

In order for the catalyst to warm up it must either absorb microwave energy itself or be in thermal contact with a material which absorbs microwave energy. In the present example the catalyst body comprises a substrate of cordierite ($2MgO.2Al_2O_3.5SiO_2$) having a cellular structure with a square cell having a pitch of 1.3 mm and a wall thickness of 0.15 mm, the substrate carrying a layer of a microwave heatable material such as $LaCoO_3$, and a surface washcoat layer of aluminium oxide and cerium oxide having a mixture of Pt:Rh in the ratio 5:1 dispersed thereon. The amount of dispersed Pt/Rh is typically 0.9 g per liter of matrix volume, and the weight of substrate to heatable material to washcoat is typically in the ratio 72:8:20.

The present invention can present a number of advantages when compared to known directly heated catalytic converter systems. Firstly, the catalyst material used does not have to include heating elements embedded within the matrix. Secondly, the system can provide a power saving of up to 50% because of improved efficiency. Thirdly, the improved power uniformity in the cavity produced by splitting the single mode can reduce the formation of hot spots in the catalyst matrix, thereby reducing the "light off" time.

Lastly, the content of the priority document GB 9525543.6 (including specifically the abstract and drawings) and the abstract of the present application are incorporated herein by reference.

What is claimed is:

1. A single mode resonant cavity, for use in a catalytic converter system, the cavity being defined by walls which are constructed and arranged such that the cavity allows electromagnetic energy to resonate via a single mode, wherein said walls are adapted such that in use the single mode is excited via a plurality of overlapping wavebands having different respective resonant frequencies, thereby increasing the resonant bandwidth of the cavity.

2. A single mode resonant cavity as claimed in claim 1, in which only the $TE_{11}$ mode is excited in operation.

3. A single mode resonant cavity as claimed in claim 1, in which the walls are adapted by the provision of an electrically conductive element adjacent said walls and being electrically connected thereto.

4. A single mode resonant cavity as claimed in claim 2, in which the walls are adapted by the provision of an electrically conductive element adjacent said walls and being electrically connected thereto.

5. A single mode resonant cavity as claimed in claim 1, in which the cavity has an electrically conductive wall, at least a part of which is adapted by having an elliptical cross-section.

6. A single mode resonant cavity as claimed in claim 2, in which the cavity has an electrically conductive wall, at least a part of which is adapted by having an elliptical cross-section.

7. A catalytic converter system for exhaust gas, comprising a single mode resonant cavity defined by walls which are constructed and arranged such that the cavity allows electromagnetic energy to resonate via a single mode, wherein said walls are adapted such that in use the single mode is excited via a plurality of overlapping wavebands having different respective resonant frequencies, thereby increasing the resonant bandwidth of the cavity, said cavity containing catalyst material, and a source of microwave energy being coupled to the cavity for heating the catalyst material.

8. A method of coupling energy via a single excitation mode to a resonant cavity from a source of electromagnetic energy having a given bandwidth, comprising adapting the cavity to allow energy to resonate via the single excitation mode in a plurality of wavebands having different respective resonant frequencies.

9. A method according to claim 8, in which at least two of the plurality of wavebands overlap, thereby increasing the resonant bandwidth of the cavity.

10. A method as claimed in claim 9, in which the cavity is adapted by the provision of an electrically conductive element inside the cavity adjacent, and electrically connected to, a wall thereof.

11. A method as claimed in claim 9, in which the cavity is adapted by deformation thereby providing at least a part of the cavity with an elliptic cross-section.

12. A method as claimed in claim 8, in which the cavity is adapted by the provision of an electrically conductive element inside the cavity adjacent, and electrically connected to, a wall thereof.

13. A method as claimed in claim 8, in which the cavity is adapted by deformation thereby providing at least a part of the cavity with an elliptic cross-section.

* * * * *